(12) United States Patent
Simmons et al.

(10) Patent No.: US 10,093,085 B2
(45) Date of Patent: Oct. 9, 2018

(54) COMPOSITE MATERIALS WITH BINDER-ENHANCED PROPERTIES AND METHOD OF PRODUCTION THEREOF

(71) Applicant: Carbitex, Inc., Kennewick, WA (US)

(72) Inventors: Kevin Lynn Simmons, Kennewick, WA (US); Tyler Andre Kafentzis, Richland, WA (US); Junus Ali Khan, Kennewick, WA (US); Tyler Ross Carpenter, Richland, WA (US); Matthew Patrick Westman, Kennewick, WA (US)

(73) Assignee: Carbitex, Inc., Kennewick, WA (US)

( * ) Notice: Subject to any disclaimer, the term of this patent is extended or adjusted under 35 U.S.C. 154(b) by 62 days.

(21) Appl. No.: 15/179,949

(22) Filed: Jun. 10, 2016

(65) Prior Publication Data

US 2016/0361909 A1 Dec. 15, 2016

Related U.S. Application Data

(60) Provisional application No. 62/175,071, filed on Jun. 12, 2015.

(51) Int. Cl.
*B32B 37/00* (2006.01)
*B32B 38/08* (2006.01)
(Continued)

(52) U.S. Cl.
CPC .............. *B32B 38/08* (2013.01); *B32B 5/02* (2013.01); *B32B 5/024* (2013.01); *B32B 27/12* (2013.01); *B32B 27/306* (2013.01); *B32B 27/40* (2013.01); *B32B 37/06* (2013.01); *B32B 37/14* (2013.01); *C08J 5/24* (2013.01); *B32B 2250/40* (2013.01); *B32B 2260/021* (2013.01); *B32B 2260/046* (2013.01); *B32B 2260/048* (2013.01);
(Continued)

(58) Field of Classification Search
CPC ....... C08J 5/24; C08J 5/04; C08J 5/041; C08J 5/042; C08J 5/043; C08J 5/044; C08J 5/045; C08J 5/046; C08J 5/047; C08J 5/048; B32B 38/08
See application file for complete search history.

(56) References Cited

U.S. PATENT DOCUMENTS 4,356,227 A 10/1982 Stenzenberger et al.
5,122,403 A * 6/1992 Roginski .......... B32B 17/10036
156/107
(Continued)

FOREIGN PATENT DOCUMENTS

EP 223061 A2 5/1987
EP 2484710 A1 8/2012
(Continued)

OTHER PUBLICATIONS

"Lumiflon Comes to America" from pcimag.com 2002.*
(Continued)

*Primary Examiner* — John L Goff, II
(74) *Attorney, Agent, or Firm* — Perkins Coie LLP (57) ABSTRACT

Provided are methods for preparing fabric laminated with polymer film(s) and the laminated fabric prepared according to the methods disclosed herein. The laminated fabric has flexibility similar to fabric not laminated with polymer films and improved adhesion and tensile strength.

20 Claims, 3 Drawing Sheets

(51) Int. Cl.
  *B32B 37/14* (2006.01)
  *B32B 37/06* (2006.01)
  *B32B 5/02* (2006.01)
  *B32B 27/12* (2006.01)
  *B32B 27/30* (2006.01)
  *B32B 27/40* (2006.01)
  *C08J 5/24* (2006.01)

(52) U.S. Cl.
  CPC ............... *B32B 2262/0261* (2013.01); *B32B 2262/0276* (2013.01); *B32B 2262/101* (2013.01); *B32B 2262/103* (2013.01); *B32B 2262/105* (2013.01); *B32B 2262/106* (2013.01); *B32B 2305/72* (2013.01); *B32B 2309/02* (2013.01)

(56) References Cited

U.S. PATENT DOCUMENTS

| | | |
|---|---|---|
| 2004/0058603 A1 | 3/2004 | Hayes et al. |
| 2010/0078201 A1 | 4/2010 | Yoshizaki et al. |
| 2011/0260945 A1* | 10/2011 | Karasawa ............ C09D 127/08 |
| | | 343/873 |
| 2013/0231022 A1 | 9/2013 | Kraatz et al. |
| 2014/0057096 A1* | 2/2014 | Moser ..................... B32B 5/28 |
| | | 428/295.4 |
| 2016/0122482 A1* | 5/2016 | Higuchi ............... B32B 27/304 |
| | | 428/221 |

FOREIGN PATENT DOCUMENTS

| | | |
|---|---|---|
| JP | 2012231140 A | 11/2012 |
| WO | 2009076499 A1 | 6/2009 |
| WO | 2015012237 A1 | 1/2015 |

OTHER PUBLICATIONS

International Searching Authority, International Search Report and Written Opinion, PCT Application PCT/US2016/037093, dated Sep. 26, 2016, 14 pages.

The International Bureau of WIPO, International Preliminary Report on Patentability, PCT Application PCT/US2016/037093, dated Dec. 21, 2017, 10 pages.

* cited by examiner

COMPOSITE MATERIALS WITH BINDER-ENHANCED PROPERTIES AND METHOD OF PRODUCTION THEREOF

CROSS-REFERENCE TO RELATED APPLICATIONS

The present application claims priority to U.S. Provisional Application No. 62/175,071, filed Jun. 12, 2015, the content of which is incorporated herein by reference in its entirety.

FIELD OF THE INVENTION

This application relates in general to composite materials, and, in particular, to composite materials with binder-enhanced properties and method of production thereof.

BACKGROUND OF THE INVENTION

The most common way of producing coated fabrics is impregnating the fabric with a material and drying or curing the coated fabric. The most common materials used for the impregnation are polyvinyl chloride, rubbers, and polyurethanes. Film coated fabrics require heat and pressure with thermoplastic polymers that have high melt index values (low melt viscosity) to penetrate fiber bundles and fabric layers. The full impregnation increases weight and cost of the coated fabric. The full impregnation also impacts the mechanical properties of the material, such as decreasing the flexibility of the coated fabric. In some cases, additives in the impregnating material that are used to increase flexibility of the coated fabric can significantly alter the polymer properties of the coating materials, such by reducing the strength of the polymer with increased plasticizer content. Accordingly, there is a need for a way to produce coated fabrics with desired material properties.

SUMMARY OF THE INVENTION

Provided herein are methods for preparing a composite material comprising (a) preparing a binder-treated fabric material and (b) laminating a polymer film on at least one fabric surface of the binder-treated fabric material to provide a laminated fabric material.

Provided herein are also composite material prepared by the methods disclosed herein.

DETAILED DESCRIPTION

Coating and laminating fibrous composite material are challenging processes, with controlling fiber wet out of hot melt resins or liquid dispersion coatings being challenging in particular. The inability to penetrate deep into a fiber bundle with significant amounts of processing techniques gives rise to poor fiber translation in the mechanical properties of the material. The preparation methods and composite material prepared according to the methods disclosed herein take advantage of diluted dispersion of low modulus binders, to partially or completely saturate a fabric material. The binder systems of interest have melting points in the range of the polymer films that are bonded to the surface. The binder is compatible with the polymer films that bind to the fabric surface, as described below. Unexpectedly, the composite material has flexibility similar to fabric not bonded to the polymer films while increasing the composite material adhesion and tensile strength. For example, the tensile strength of the composite material can be increased by over 100% as compared to fabric without binder with bonded films. Similarly, the adhesion strength of a polymer film bonded to the fabric can be increased by about 400% when compared to when no binder is used to bind the fabric to the polymer film. As used herein, unless otherwise specified, "about" means±2%, ±3%, ±5%, or ±10% of the numeric value following "about."

While certain embodiments are given below by way of illustration, other embodiments of the present disclosure will become readily apparent to those skilled in the art. As will be realized, other and various embodiments and modifications thereof are available without departing from the spirit and the scope of the present disclosure. Accordingly, the drawings and detailed description are to be regarded as illustrative in nature and not as restrictive.

One aspect of the disclosure relates to a method for preparing a composite material comprising (a) preparing a binder-treated fabric material and (b) laminating a polymer film on at least one fabric surface of the binder-treated fabric material to provide a laminated fabric material (e.g., the composite material).

The methods of certain embodiments comprise the following steps:

a) preparing a binder-treated fabric material comprising:

a-i) applying a binder dispersion to a fabric substrate to provide a binder dispersion-treated fabric material, the binder dispersion comprising a binder and a dispersion solvent, and the dispersion solvent comprising a first solvent (e.g., water, organic solvents, or mixtures thereof) and optionally a co-solvent miscible with the first solvent (e.g., coalescing agents such as N-methyl-2-pyrrolidone (NMP), 2,2-dimethoxypropane (DMP), alkylphenolethoxylate (APEO), triethylamine (TEA), or mixtures thereof);

a-ii) removing at least about 50%, at least about 80%, at least about 90%, at least about 95%, at least about 98%, or at least about 99% of the dispersion solvent of the binder dispersion-treated fabric material to provide a dried binder dispersion-treated fabric material, at a temperature of about 10° C. lower than the boiling point of the first solvent (e.g., about 90° F. to about 190° F., about 100° F. to about 110° F., about 95° F. to about 105° F., or about 105° F.) for about 10 to about 90 minutes, or about 50 minutes; and a-iii) curing the binder in the dried binder dispersion-treated fabric material to provide a binder-treated fabric material at a temperature of about 160° F. to about 280° F., or about 200° F. for about 10 minutes to about 90 minutes, or about 30 minutes; and b) laminating a polymer film to at least one side of the binder-treated fabric material to provide a laminated fabric material comprising b-i) applying a first film on a first side of the binder-treated fabric material;

b-ii) applying a second film to the other side of the binder-treated fabric material; to provide a laminated fabric material; and b-iii) laminating the films to the binder-treated fabric material to provide the laminated fabric material.

The methods of certain embodiments comprise the following steps:

a) preparing a binder-treated fabric material comprising:

a-i) applying a binder dispersion to a fabric substrate laminated with a first film on one side to provide a binder dispersion-treated fabric material, the binder dispersion is applied to the side of the fabric that is not laminated with the first film, the binder dispersion comprising a binder and a dispersion solvent, and the dispersion solvent comprising a first solvent (e.g., water, organic solvents, or mixtures thereof) and optionally a co-solvent miscible with the first solvent (e.g., coalescing agents such as N-methyl-2-pyrrolidone (NMP), 2,2-dimethoxypropane (DMP), alkylphenolethoxylate (APEO), triethylamine (TEA), or mixtures thereof);

a-ii) removing at least about 50%, at least about 80%, at least about 90%, at least about 95%, at least about 98%, or at least about 99% of the dispersion solvent of the binder dispersion-treated fabric material to provide a dried binder dispersion-treated fabric material, at a temperature of about 10° C. lower than the boiling point of the first solvent (e.g., about 90° F. to about 190° F., about 100° F. to about 110° F., about 95° F. to about 105° F., or about 105° F.) for about 10 to about 90 minutes, or about 50 minutes; and a-iii) curing the binder in the dried binder dispersion-treated fabric material to provide a binder-treated fabric material at a temperature of about 160° F. to about 280° F., or about 200° F. for about 10 minutes to about 90 minutes, or about 30 minutes; and b) laminating a polymer film to the binder-treated fabric material to provide a laminated fabric material comprising b-ii) applying a second film to the side of the binder-treated fabric material that is not laminated with the first film to provide a laminated fabric material; and b-iii) laminating the films to the binder-treated fabric material to provide a laminated fabric material.

Another aspect of the disclosure relates to the composite material prepared according to the method disclosed herein.

In certain embodiments of the method and products disclosed herein, the fabric may be pretreated and dried before starting binder treatment.

In certain embodiments of the method and products disclosed herein, the fabric substrate may be made of natural fibers (e.g., kenaf and jute) and/or synthetic fibers. Examples of synthetic fibers include, without limitation, inorganic fibers (e.g., carbon fiber, glass fibers, ceramic fibers such as alumina fibers and silicon carbide, and metallic fibers such as metal fibers, plastic-coated metal fibers, metal-coated plastic fibers, or a core completely covered by metal), organic fibers (e.g., polymers, including, without limitation, polyesters, and polyamides (e.g., aramid such as Kevlar, and nylon)), and combinations thereof. Examples of metals metallic fibers comprise include, without limitation, gold, silver, aluminum, iron, copper, an alloys thereof. Examples of the plastic metallic fibers comprise include, without limitation, nylon.

In certain embodiments of the method and products disclosed herein, the binder dispersion comprises a binder and a dispersion solvent. Binder may be a low modulus material of a homogeneous polymer, copolymer or blends thereof, e.g., polyurethane, acrylic polymers, polyethylene, polypropylene, polyamides, elastomer materials in the thermoplastic or thermoset families, such as thermoplastic polyurethanes, styrene butadiene styrene block copolymers (SBS), styrene-ethylene/butylene-styrene (SEBS), styrene-ethylene/propylene-styrene (SEPS), thermoplastic polyolefins (TPO), silicones, and other rubber systems such as ethylene-propylene rubber, butyl rubber, nitriles rubber, and mixtures thereof. Examples of the binder include, without limitation, polyurethanes, the aqueous dispersions of which have secant 100% modulus of about 10 psi to about 3,000 psi, about 100 psi or lower (e.g., Bondthan™ waterborne polyurethane dispersions UD-125), about 100 psi (e.g., Bondthan™ waterborne polyurethane dispersions UD-375), about 160 psi (e.g., Permax™ 232), about 310 psi (e.g., Permax™ 202), about 320 psi (e.g., Sancure 13094HS), about 100 psi to about 600 psi (e.g., Sancure 20025F), or about 100 psi to about 3,000 psi, with pH of about 2 to about 10, or about 6, and mean particle size of about 100 nm to about 850 nm, or about 450 nm. Binder concentration of the binder dispersion can be from about 0.1% to about 50% by weight, about 0.5% to about 10%, about 2% to about 8%, about 2.5% to about 5%, about 2.5%, or about 5%. As used herein, a solvent may be a single solvent or a mixture of multiple solvents. The dispersion solvent comprises a first solvent (e.g., water, organic solvents (e.g., toluene, xylene, DMF, THF, siloxanes), or mixtures thereof), and optionally a co-solvent miscible with the first solvent (e.g., coalescing agents such as NMP, DMP, APEO, TEA, and mixtures thereof, with or without a catalyst). The concentration of the co-solvent is about 2% to about 5%, or about 3.5% of the total weight of the dispersion solvent. Optionally, the dispersion solvent may be coalescing agent free.

In certain embodiments of the method and products disclosed herein, the binder dispersion may be applied to one side or both sides of the fabric substrate. Optionally, the fabric substrate may be dry or may be further dried before applying the binder dispersion thereto. The binder dispersion may be applied by any method that is applicable, e.g., spraying, dipping, rinsing, and/or applying by a bar or a roller. Optionally, pressure is applied to the binder dispersion-treated fabric material (e.g., by pressing, and/or squeezing), to facilitate dispersion of the binder dispersion through the fabric material and/or to remove excess binder dispersion. The fabric material may be partially or completely saturated with the binder dispersion.

In certain embodiments of the method and products disclosed herein, the amount of dispersion left with the fabric material may be controlled by controlling the amount of the binder dispersion applied to the fabric material. For example, the binder of the binder-treated fabric material may be about 0.1% to about 50%, about 0.1% to about 30%, about 0.1% to about 15%, about 5% to about 15%, about 5% to about 10%, about 3% to about 10%, about 3% to about 8%, or about 5% by weight of the combined weight of the binder and the fabric. The binder-treated fabric material may gain about 3% to about 8%, or about 5% weight compared to the fabric substrate before the binder treatment. For example, a dry fabric substrate may be 190 g before and weigh 200 g after the binder treatment.

In certain embodiments of the method and products disclosed herein, the binder dispersion-treated fabric is dried at a temperature of about 10° C. lower than the boiling point of the first solvent, e.g., about 90° F. to about 190° F., about 105° F., a temperature of about 30° C. to about 85° C., about 35° C. to about 80° C., about 35° C. to about 60° C., about 35° C. to about 50° C., about 35° C. to about 45° C., or about 40° C., until at least about 50%, at least about 80%, at least about 90%, at least about 95%, at least about 98%, or at least about 99% dispersion solvent is evaporated. The evaporation time may be about 20 min or less, about 10 min to about 90 min, about 20 min to about 2 hr, about 30 min to about 1.5 hr, about 40 min. to about 1 hr, or about 50 min. In certain embodiments, slow solvent evaporation improved the property of the final composite material obtained. In certain embodiments, fast solvent evaporation (e.g., 20 min or less) does not have adverse effects to the property of the final composite material obtained.

In certain embodiments of the method and products disclosed herein, the curing step is carried out at a temperature of about 90° C. to about 200° C., about 90° C. to about 100° C., about 90° C. to about 95° C., about 120° C. to about 180° C., about 150° C. to about 190° C., about 93.3° C. or about 160° C. The curing process may last for about 2 min to about 2 hr, about 2 min to about 1.5 hr, 2 min to about 3 min, about 10 min to about 1.5 hr, about 10 min to about 1 hr, about 15 min to about 1 hr, about 30 min to about 1 hr, about 40 min to about 1 hr, or about 50 min. Processing times of less than two minutes may decrease ply adhesion of the composite material.

In certain embodiments of the method and products disclosed herein, the binder-treated fabric material enhances the binding between the fabric and the polymer films to be applied in lamination (e.g., Example 1).

In certain embodiments of the method and products disclosed herein, polymer films can be any film compatible with the binder (e.g., having a melting point of about ±5° C. to about ±10° C. compared to the melting point of the binder). Examples of polymer film include, without limitation, thermoplastic urethanes, ethylene-vinyl acetate copolymers, polyolefines, polypropylene, carboxylated acrylonitrile butadiene copolymers, for examples, DUREFLEX® A4000 series and ZEON NBR latex films (e.g., Nipol® 1571H, Nipol® LX511A, Nipol® LX552), nolax A21.2007, nolax A21.2010, nolax A21.2011, and nolax A21.2049. The thickness of the film may vary, e.g., without limitation, about 0.0005 inches to about 0.025 inches, about 4 mil, or about 2 mil.

In certain embodiments of the method and products disclosed herein, step b-i) optionally further comprises laminating the first film to the binder-treated fabric material.

In certain embodiments of the method and products disclosed herein, the polymer films may be laminated to a side of the binder-treated fabric material by hot melt, hot bond, or hot press. For example, a hot press may apply a pressure of about 0.5 psi to about 50 psi, about 150 psi to about 200 psi, about 7 psi, or about 25 psi at a temperature of about 120° C. to about 200° C., about 130° C. to about 180° C., about 140° C. to about 170° C., about 150° C. to about 160° C., about 100° C. to about 170° C., about 105° C. to about 163° C., about 130° C., about 137.8° C. (280° F.), about 143.3° C. (290° F.), about 148.9° C. (300° F.), about 150° C., about 162.8° C. (325° F.), about 177° C., or about 160° F. to about 400° F., for about 1 min to about 20 min, about 2 min to about 10 min, or about 2 min to about 30 min, or about 7.5 min.

In certain embodiments of the method and products disclosed herein, the laminated fabric material is optionally further heated at a temperature of about 120° C. to about 200° C., about 130° C. to about 180° C., about 140° C. to about 170° C., about ° C. 150° C. to about 160° C., about 130° C., about 137.8° C. (280° F.), about 143.3° C. (290° F.), about 148.9° C. (300° F.), about 150° C., about 162.8° C. (325° F.), about 177° C., or about 160° F. to about 400° F. for about 2 minutes to about 30 minutes, or about 20 minutes. Optionally, the laminated fabric material is hot pressed at a temperature of about 120° C. to about 200° C., about 130° C. to about 180° C., about 140° C. to about 170° C., about ° C. 150° C. to about 160° C., about 130° C., about 137.8° C. (280° F.), about 143.3° C. (290° F.), about 148.9° C. (300° F.), about 150° C., about 162.8° C. (325° F.), or about 177° C., for about 10 min to about 1 hr, about 15 min to about 45 min, about 15 min to about 30 min, or about 20 min, with a pressure of about 0.5 psi to about 50 psi, about 150 psi to about 200 psi, about 7 psi, or about 25 psi.

In certain embodiments of the method and products disclosed herein, the binder dispersion applied substantially uniformly throughout the fabric.

In certain embodiments of the method and products disclosed herein, the binder dispersion is applied at desired position of the fabric material for enhanced material properties in those positions. For example, one could have four different sections of a 50 inch wide fabric with different stripe widths along the length of the fabric with different binder formulations that control stiffness within the fabric while being bonded together with the film material to the surface.

While the invention has been particularly shown and described as referenced to the embodiments thereof, those skilled in the art will understand that the foregoing and other changes in form and detail may be made therein without departing from the spirit and scope of the invention.

EXAMPLES

Figure 1:
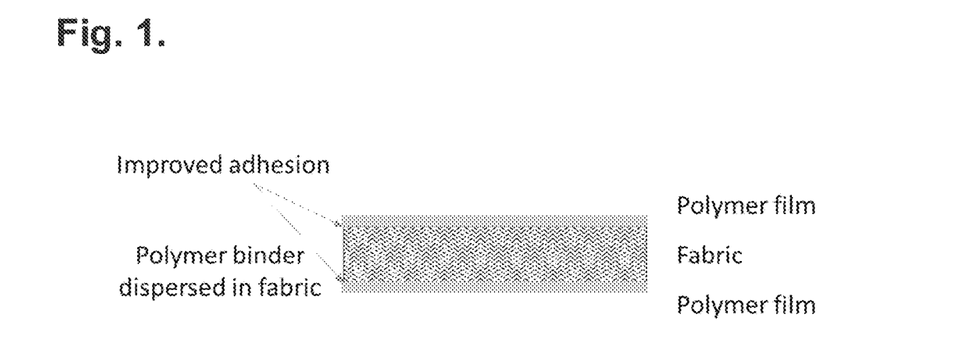
FIG. 1 is an illustration of a composite material that includes a fabric center section with a binder dispersed through the fabric for improved adhesion to the two outer polymer film layers in accordance with one embodiment of the present technology.

Example 1. Binder-Treated Fabric Material has Improved Binding Between the Fabric and Polymers Films FIG. 1 is an illustration of a composite material that includes a fabric center section with a binder dispersed through the fabric for improved adhesion to the two outer polymer film layers in accordance with one embodiment.

A carbon fiber fibrous fabric (2×2 twill weave with weave pattern at right angles 0/90 degree) was bonded with a polymer film by heat with and without the use of binder dispersions (Table 1). A binder dispersion having the corresponding binder concentration (2.5% or 5%, Table 1) were applied to the fabrics by bar coating. The binder dispersions were prepared by combining the corresponding binder dispersion (commercially available) with water to provide the desired binder concentrations.

TABLE 1

| Bar # (FIG. 2) | Binder Commercial Name | Binder Chemical | Binder Concentration in dispersion (% solids by weight) |
|---|---|---|---|
| 1 | None (no binder) | | none |
| 2 | Permax 202 manufactured by Lubrizol Advanced Materials, Inc. of Cleveland, Ohio | Aliphatic/polyether waterborne polyurethane (secant 100% modulus of 310 psi) | 2.5 |
| 3 | Permax 202 manufactured by Lubrizol Advanced Materials, Inc. of Cleveland, Ohio | Aliphatic/polyether waterborne polyurethane (secant 100% modulus of 310 psi) | 5 |
| 4 | Permax 232 manufactured by Lubrizol Advanced Materials, Inc. of Cleveland, Ohio | Aliphatic/polyether waterborne polyurethane (secant 100% modulus of 160 psi) | 2.5 |
| 5 | Permax 232 manufactured by Lubrizol Advanced Materials, Inc. of Cleveland, Ohio | Aliphatic/polyether waterborne polyurethane (secant 100% modulus of 160 psi) | 5 |
| 6 | Bondthane 375 manufactured by Bond Polymers International LLC of Seabrook, New Hampshire | Aliphatic/polyether waterborne polyurethane (secant 100% modulus of 100 psi) | 2.5 |
| 7 | Bondthane 375 manufactured by Bond Polymers International LLC of Seabrook, New Hampshire | Aliphatic/polyether waterborne polyurethane (secant 100% modulus of 100 psi) | 5 |
| 8 | Sancure 13094HS manufactured by Lubrizol Advanced Materials, Inc. of Cleveland, Ohio | Aliphatic polyurethane dispersion (secant 100% modulus of 300 psi) | 2.5 |
| 9 | Sancure 13094HS manufactured by Lubrizol Advanced Materials, Inc. of Cleveland, Ohio | Aliphatic polyurethane dispersion (secant 100% modulus of 320 psi) | 5 |
| 10 | Sancure 20025F manufactured by Lubrizol Advanced Materials, Inc. of Cleveland, Ohio | Aliphatic polyester urethane polymer dispersion (secant 100% modulus of 100-600 psi) | 2.5 |
| 11 | Sancure 20025F manufactured by Lubrizol Advanced Materials, Inc. of Cleveland, Ohio | Aliphatic polyester urethane polymer dispersion (secant 100% modulus of 100-600 psi) | 5 |

Figure 2:
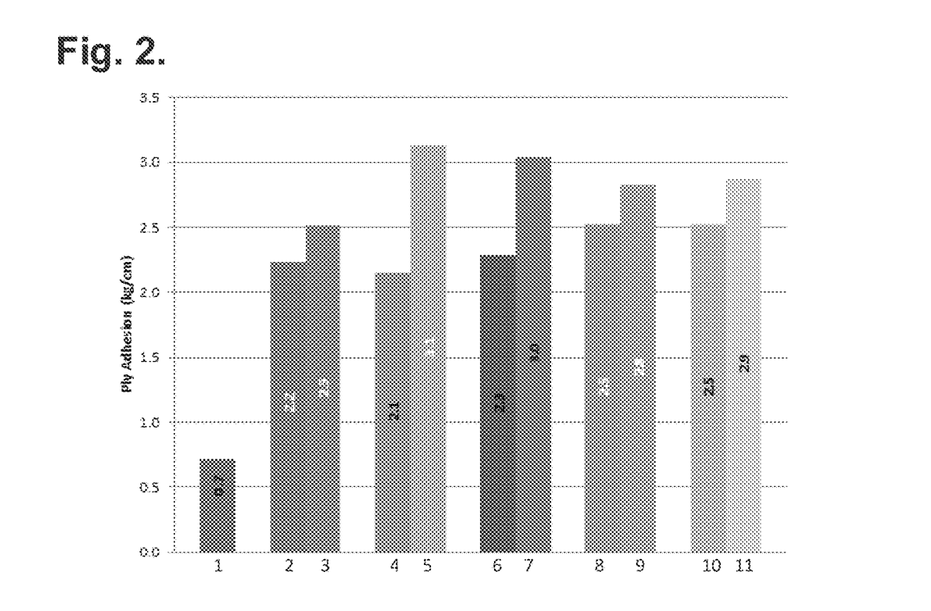
FIG. 2 is a bar graph illustrating ply adhesion (film bond strength) values of a 2×2 twill weave with the weave pattern at right angles 0/90 degree with a polymer film heat bonded to the surface, with and without use of binder dispersions.

The fabric wetted with the dispersion was dried at temperatures between 50-85° C. until all of the water was evaporated in 20 minutes or less. The binder left in the dried fabric was optionally cured at 160° C. for 10-30 minutes, or 10-15 minutes. Processing times of less than two minutes decreased ply adhesion of the composite fabric system. The binder coated on the fabric left after the water evaporation and optional curing enhanced the binding of the fabric to the polymer films (Dureflex A4010 4 mil aliphatic polyether thermoplastic polyurethane film) (FIG. 2). The ply adhesion was tested by first bonding two outer surfaces of the fabric with an elastomeric polymer film. The two outer surfaces of the fabric were bonded to a film substrate for testing and a t-peel test was performed to peel the two outer surfaces away from each other resulting in adhesion strength with in the fabric or the surface bonded films. A poor adhesion resulted in the polymer films bonded to the surface to peel away. A polymer film well-bonded to the surface caused the fabric to separate between the two bonded surfaces cohesively. The cohesive separation was the desired failure mechanism. The film bond strength values are plotted in the bar graph of FIG. 2.

The bar graph of FIG. 2 shows ply adhesion values of a fabric heat bonded to a polymer film without using a binder (Bar 1) and composite materials that were created through application of the method described above using dispersions of various binders. The amount of the dispersion applied (5%) as well as the kind of the polymer film and fabric used were the same for composite materials whose test results are shown in Bars 2-11 of FIG. 2. FIG. 2 illustrates a significant improvement of the ply adhesion with a cohesive failure in the middle of the composite material as compared to fabric laminated to the polymer film without use of a binder. The data confirms a four-fold or higher increase in the ply adhesion.

Example 2: Property of Examples of Composite Material Prepared by the Methods Disclosed Herein A polymer film (Dureflex A4010 4 mil aliphatic polyether thermoplastic polyurethane film) was hot melt laminated to one side (the front side) of a fabric made of carbon fiber directly. Then the fabric with one side laminated was treated at the side without lamination (the back side) with a binder dispersion as described in Table 2, dried and cured according to the method described in Example 1. The back side of the binder-treated fabric was laminated with the polymer film (Dureflex A4010 4 mil aliphatic polyether thermoplastic polyurethane film) by hot press or hot melt for 2-10 minutes at temperatures of 105° C. to 163° C. Following creation of the composite material, additional heating was optionally performed to improve the properties of the composite material, as further described with reference to FIGS. 4 and 5.

Figure 3:
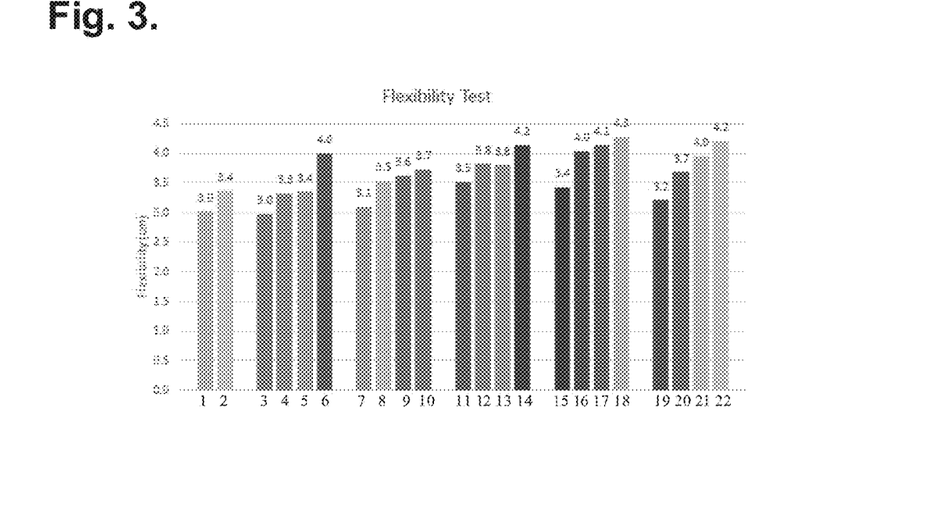
FIG. 3 is a bar graph illustrating the material flexibility of 2.54 cm strips of composite material of FIG. 1 that were made using dispersions of various binders at various concentrations.

FIG. 3 is a bar graph illustrating the material flexibility of 2.54 cm strips of composite material of FIG. 1 that were made according to the methods disclosed above with dispersions of various binders at various concentrations, as listed in Table 2.

For comparison, Bars #1 and 2 of FIG. 3 show flexibility of fabric that was not treated with a binder dispersion and poorly bonded to the polymer film. The identity and the binder concentration in the dispersions used to make the composite materials tested are presented below in Table 2, with the results of the testing shown with reference to Bars 3-12. The amount of the dispersion applied as well as the kind of the polymer film and fabric used were kept constant for composite materials whose test results are shown in Bars 3-12. The binder dispersions at concentrations of 2.5% and 5% were applied to increase the fabric weight by 2.5% and 5%, respectively. The flexibility was tested by using a modification of Indian Standard 6490-1971, Reaffirmed 2004, published by Indian Standard Institution in "Method for Determination of Stiffness of Fabrics—Cantilever Test," the disclosure of which is incorporated by reference. Briefly, both the front and the back of the composite material were tested. The front of the strip was considered the first lamination side bonded to the fabric and the back was the second side. When testing the strip, the top of the strip was always under tension from bending, therefore the front and the back were placed on the top when the flexibility of the front side and the back side, respectively, were tested.

TABLE 2

| Bar # | Binder Commercial Name | Front/Back | Binder Concentration in Dispersion (% solids by weight) |
|---|---|---|---|
| 1 | None (no binder) | Front | None |
| 2 | None (no binder) | Back | None |
| 3 | Permax 202 manufactured by Lubrizol Advanced Materials, Inc. of Cleveland, Ohio | Front | 2.5 |
| 4 | Permax 202 manufactured by Lubrizol Advanced Materials, Inc. of Cleveland, Ohio | Back | 2.5 |
| 5 | Permax 202 manufactured by Lubrizol Advanced Materials, Inc. of Cleveland, Ohio | Front | 5 |
| 6 | Permax 202 manufactured by Lubrizol Advanced Materials, Inc. of Cleveland, Ohio | Back | 5 |
| 7 | Permax 232 manufactured by Lubrizol Advanced Materials, Inc. of Cleveland, Ohio | Front | 2.5 |
| 8 | Permax 232 manufactured by Lubrizol Advanced Materials, Inc. of Cleveland, Ohio | Back | 2.5 |
| 9 | Permax 232 manufactured by Lubrizol Advanced Materials, Inc. of Cleveland, Ohio | Front | 5 |
| 10 | Permax 232 manufactured by Lubrizol Advanced Materials, Inc. of Cleveland, Ohio | Back | 5 |
| 11 | Bondthane 375 manufactured by Bond Polymers International, LLC of Seabrook, New Hampshire | Front | 2.5 |
| 12 | Bondthane 375 manufactured by Bond Polymers International, LLC of Seabrook, New Hampshire | Back | 2.5 |
| 13 | Bondthane 375 manufactured by Bond Polymers International, LLC of Seabrook, New Hampshire | Front | 5 |
| 14 | Bondthane 375 manufactured by Bond Polymers International, LLC of Seabrook, New Hampshire | Back | 5 |
| 15 | Sancure 13094HS manufactured by Lubrizol Advanced Materials, Inc. of Cleveland, Ohio | Front | 2.5 |
| 16 | Sancure 13094HS manufactured by Lubrizol Advanced Materials, Inc. of Cleveland, Ohio | Back | 2.5 |
| 17 | Sancure 13094HS manufactured by Lubrizol Advanced Materials, Inc. of Cleveland, Ohio | Front | 5 |
| 18 | Sancure 13094HS manufactured by Lubrizol Advanced Materials, Inc. of Cleveland, Ohio | Back | 5 |
| 19 | Sancure 20025F manufactured by Lubrizol Advanced Materials, Inc. of Cleveland, Ohio | Front | 2.5 |
| 20 | Sancure 20025F manufactured by Lubrizol Advanced Materials, Inc. of Cleveland, Ohio | Back | 2.5 |
| 21 | Sancure 20025F manufactured by Lubrizol Advanced Materials, Inc. of Cleveland, Ohio | Front | 5 |
| 22 | Sancure 20025F manufactured by Lubrizol Advanced Materials, Inc. of Cleveland, Ohio | Back | 5 |

The data shown in FIG. 3 illustrates how composite material flexibility varied by varying quantity and identity of the binder used to create the composite material.

A layer of polymer film was hot melt laminated to a front side of the fabric and a binder dispersion was applied to the back side, dried, and cured. After drying the back side of the fabric, a second layer of polymer film was hot melt laminated to the back side of the fabric that was treated with dispersion. As seen in FIG. 3, for the composite materials tested, the back side flexibility values were all higher than the front side which indicated a higher level of bonding on the back side. The laminated fabric at the binder-treated side (back side) had improved flexibility than the laminated fabric without binder-treatment (front side). Therefore, as seen from the data of FIG. 3, a fabric could be pre-impregnated with a desired binder system and dried that would then have polymer films bonded to the fabric surfaces.

Figure 4:
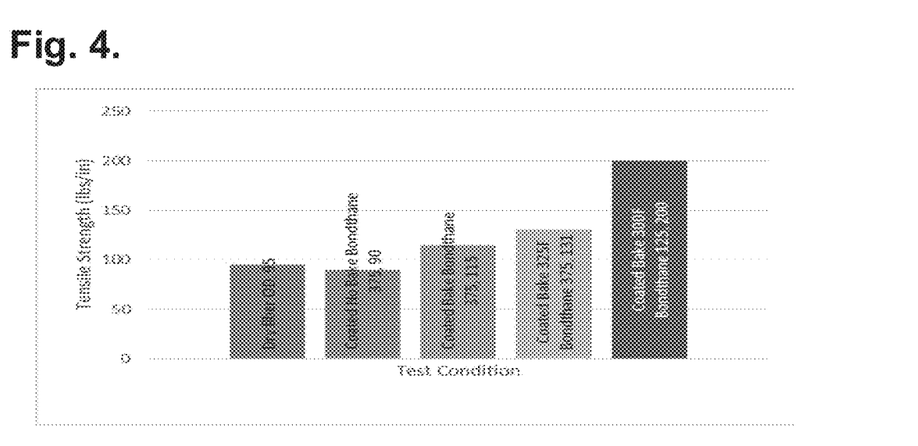
FIG. 4 is a bar graph illustrating improved tensile strength of composite material of FIG. 1 as the cure temperature of the material increased or the binder material was changed at a constant binder content of 2.5% by weight.
Figure 5:
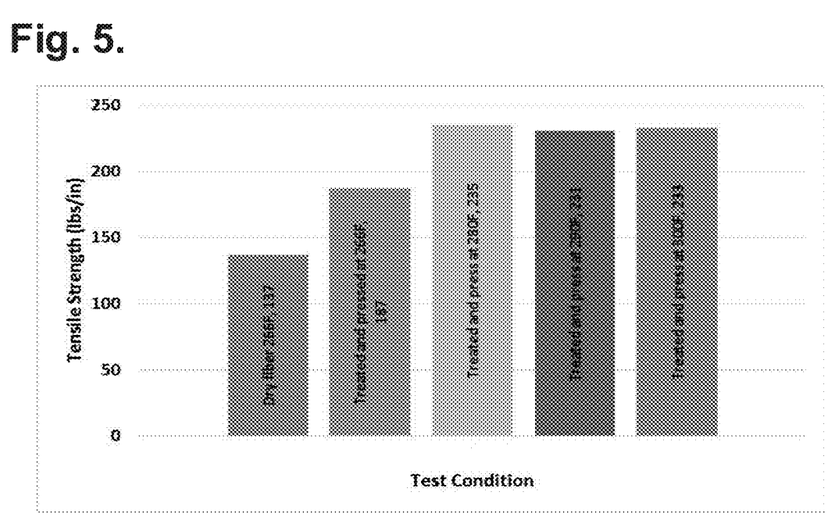
FIG. 5 is a bar graph illustrating an effect of temperature on tensile strength performance of the composite material of FIG. 1.

FIGS. 4 and 5 showed temperature impact to the properties of the composite material. The additional heating of the laminated fabric material (bake) increased bonding of the fiber bundles to each other and to the polymer film showed an up to 100% increase in the tensile strength of fabric.

FIG. 4 is a bar graph illustrating improved tensile strength of composite material of FIG. 1 as the cure temperature of the material increased or the binder material was changed at a constant binder content of 2.5% by weight. Testing has demonstrated that additional, subsequent to heat bonding of the polymer film to the fabric treated with binder, heat treating in a recirculating oven of the composite material up to 177° C. for approximately 20 minutes increased the tensile strength of the composite material without significantly altering the flexibility of the material as shown in FIG. 4. FIG. 4 shows tensile strength of oven-dried dry fiber not treated with binder or bonded to polymer film (95 lbs/inch strength); composite material created using the Bondthane 375 product described above that did not undergo additional heat treating ("bake"), having 90 lbs/inch strength; composite material created using the Bondthane 375 product described above that underwent additional heat treating at 300° F., having 115 lbs/inch strength; composite material created using the Bondthane 375 product described above that underwent additional heat treating at 325° F., having 131 lbs/inch strength; and composite material created using the Bondthane 125 product (aliphatic/polyester waterborne polyurethane (secant 100% modulus<100 psi)) described above that underwent additional heat treating at 300° F., having 200 lbs/inch strength. The concentration of binder in the dispersion used to create the test composite material, the kind of fabric, and the kind of polymer film were kept constant for all of the composite materials tested as shown in FIGS. 4-5.

The temperature for the heat bonding of the polymer film to the binder-treated fabric also affected tensile strength. FIG. 5 shows the temperature effect on tensile strength performance of the composite material of FIG. 1. The composite material in all instances used a concentration of 5% Bondthane 125 product described above. For comparison, tensile strength of dry fiber fabric heated to 266° F. (137 lb/inch strength) was included. Other conditions included heat pressing the polymer film to the fabric treated with the binder at 266° F. (187 lb/inch strength); heat pressing polymer film to the fabric treated with the binder at 280° F. (235 lb/inch strength); heat pressing the polymer film to the fabric treated with the binder at 290° F. (231 lb/inch strength); and heat pressing polymer film to the fabric treated with the binder at 300° F. (233 lb/inch strength). The maximum temperature used was about 150° C., as no additional increase in tensile properties was obtained by using higher temperatures.

Example 3

Carbon Fiber Substrates

The primary carbon fiber used was a 3 k tow size woven into a 2×2 twill weave style and ranged in areal weight from 95 to 320 gsm, e.g., 200 to 268 gsm. Other weave styles such as plain, satin, and some custom designs were also used.

These materials were cut to size and prepared to be sprayed or bar coated for applying the dispersion into the fabric.

Dispersion

Different levels of dispersion were tested for treating the fabric material of carbon fibers. The selected dispersions were obtained at elevated concentration levels. For example, the Bondthane UD-125 (aliphatic/polyester waterborne polyurethane (secant 100% modulus<100 psi)) was received at an initial concentration of 33%, which was diluted in a ratio of 15% UD-125 and 85% deionized water to obtain a 5% dispersion concentration ready to be applied to the substrate material. The binder dispersion material was mixed with deionized water in a 55 gallon drum for production for about one hour.

The solid content of the binder-treated material was validated for solid content by drying and curing in a cup by mass loss and measuring the residual polymer content left in the cup.

The binder dispersion was applied by spray or bar coating to one side of the fabric material and allowed to soak in on the spray process where the quantity of material applied during the spraying was controlled by application speed, pressure, and nozzle size. The bar coating method applied a liberal amount of material across the surface and stainless steel bar was used to evenly apply the binder dispersion across the fabric and remove any excess material.

Drying and Curing

The binder dispersion-treated substrate materials were then placed in a two-step drying and curing process. The first step removed the excess water by heating the binder dispersion-treated substrate materials at 105° F. for about 50 minutes, depending on the number of sheets in the production oven and the water amount to be removed. The oven is configured to contain multiple sheets (e.g., up to about 40 sheets, up to about 60 sheets) at a time, and the binder dispersion-treated substrate material was heated until substantially all water was removed.

The dried binder dispersion treated substrate material was heated in a curing oven at 180° F. or 200° F. for about 30 minutes to provide the binder-treated substrate material.

A binder-treated substrate material was weighed before and after the binder treatment to measure the final weight gain target of about 5%. For example, a dry substrate before binder treatment weighed 190 grams and 200 grams after.

Laminating

The binder-treated substrate material were then prepared to be laminated on a vacuum laminating table. IR heaters were preheated for 20 minutes to be at an equilibrium in temperature. The laminating table was preheated to 120° F. by traversing the laminating heaters across the empty table 3-5 times. A vacuum test was run on the table and measured. The minimum vacuum level was 90% of full scale or greater on the gauge. The pressure gauge at full scale was 30.5 in of Hg.

After the initial pre-setup was completed, the binder-treated fabric obtained from the previous step was laid onto the laminating table and a pre-cut piece of film (Duraflex A4010, 4 mil) was laid on top of the binder-treated fabric and the entire length and width of the vacuum coating section to seal off the vacuum table. A slight vacuum was then provided to the table to smooth out the film so there were no wrinkles. Once the film was completely smooth, full vacuum was given and the gauge was confirmed to be 90% or greater. With the material now ready to laminate, the traverse was now set in motion and the heaters moved across the table to fuse the film to the binder-treated fabric. This process not only fused the two materials together, but also provided a textured coating to the final product when necessary.

The front-laminated sheets were now ready for the pressing operation.

Pressing

The pressing operation used a heated platen press. The press platen was preheated to 280° F. or the desired temperature for the material to be used. Depending on the surface texture and sheen, the press may have a ⅜ inch thick silicone foam pad with a ⅜ inch thick silicone rubber sheet with the final sheen on it. The press was then cycled three times to pre-heat the pads and the press for production processing.

The front-laminated sheet was placed with the Duraflex A4010 4 mil (thermoplastic polyurethane—TPU) side down on the silicone pad. A second pre-cut TPU was laid onto the back side of the front-laminated sheet which had no film. A press pad was placed on top of the TPU. The stack of material was then slid in under the heated platen and the press was activated to apply 7 psi to the laminated stack. The pressure was changed for different material configurations and material types, e.g., up to about 25 psi.

The composite material was pressed for 7.5 minutes and then press was released. The composite material was slid out from under the press and removed from the press pad and the silicone rubber pad that provided texture and sheen. The final sheet was then trimmed to the final size for shipping.

The pressing could vary to provide a flat finished surface instead of rough contour to the fabric. The press was set up with a thin 3/16 inch thick silicone foam rubber pad that had a specific type of release paper for the finished sheen on it placed on top of the thin silicone foam pad. The front-laminated sheet was placed with the TPU side down on the release paper with a TPU film placed on the back side of the front-laminated sheet. Then the press pad was applied and the cycle of sliding under the platen to press began. Pressure, time, and temperature were then modified accordingly.

Table 3 shows areal weights, breaking strength and tensile strength of several examples of composite material prepared as described supra.

TABLE 3

Properties of composite materials prepared using US-125 as the binder on 3k 2x2 twill fabric made of carbon fiber

| | | Untreated fabric 1 | Binder-treated fabric 1 | Untreated fabric 2 | Binder-treated fabric 2 |
|---|---|---|---|---|---|
| | Areal Weight (g/m$^2$) | 268 | 281.4 | 200 | 210 |
| Finished Textile | gsm | 456 | 486 | 400 | 419 |
| | Thickness (mm) | 0.518 | 0.61 | 0.457 | 0.509 |
| Breaking Strength (lbs) | Warp | 442 | 644 | 295 | 288 |
| Grab test method | Fill | 398 | 679 | 411 | 544 |
| 5x8 in specimen grabbed with one inch wide grips in the middle | 45 degree | 342 | 459 | 343 | 400 |
| Tensile Strength (lbs/in) | Warp | 464 | 612 | 410 | 436 |
| One inch wide specimens | Fill | 423 | 677 | 405 | 598 |
| | 45 degree | 171 | 237 | 139 | 172 |

The invention claimed is:

1. A method for preparing a laminated fabric material comprising the following steps:
   a) preparing a binder-treated fabric material comprising:
      a-i) applying a binder dispersion to a fabric substrate to provide a binder dispersion-treated fabric material, the binder dispersion comprising a binder and a dispersion solvent, and the dispersion solvent comprising a first solvent and optionally a co-solvent miscible with the first solvent;
      a-ii) removing at least about 50% of the dispersion solvent of the binder dispersion-treated fabric material to provide a dried binder dispersion-treated fabric material, at a temperature of about 10° C. lower than the boiling point of the first solvent for about 10 to about 90 minutes; and
      a-iii) curing the binder in the dried binder dispersion-treated fabric material to provide a binder-treated fabric material at a temperature of about 160° F. to about 280° F. for about 10 minutes to about 90 minutes, the binder-treated fabric material gains about 3% to about 8% weight compared to the fabric substrate before the binder treatment; and
   b) laminating a polymer film to the binder-treated fabric material to provide a laminated fabric material comprising
      b-i) applying a first film on a first side of the binder-treated fabric material;
      b-ii) applying a second film to another side of the binder-treated fabric material; to provide a laminated fabric material; and
      b-iii) laminating the films to the binder-treated fabric material to provide the laminated fabric material.

2. The method of claim 1, wherein the fabric substrate is made of natural fibers, and or synthetic fibers.

3. The method of claim 2, wherein the natural fibers are selected from the group consisting of kenaf and jute.

4. The method of claim 2, wherein the synthetic fibers are selected from the group consisting of organic fibers, inorganic fibers, and combinations thereof.

5. The method of claim 4, wherein the organic fibers are polymer fibers.

6. The method of claim 5, wherein the polymer fibers are polyamides, polyesters, or combinations thereof.

7. The method of claim 4, wherein the inorganic fibers are selected from the group consisting of carbon fibers, glass fibers, ceramic fibers, metallic fibers, and combinations thereof.

8. The method of claim 7, wherein the ceramic fibers are selected from the group consisting of alumina fibers, silicon carbide, and combinations thereof.

9. The method of claim 1, wherein the binder is a material of a homogeneous polymer, copolymer, or blends thereof.

10. The method of claim 9, wherein the material is selected from the group consisting of polyurethane, acrylic polymers, polyethylene, polypropylene, polyamides, and combinations thereof.

11. The method of claim 9, wherein the binder is an elastomer material selected from the group consisting of thermoplastic polyurethanes, styrene butadiene styrene block copolymers, styrene-ethylene/butylene-styrene, styrene-ethylene/propylene-styrene, thermoplastic polyolefins, silicones, rubber systems, and combinations thereof.

12. The method of claim 11, wherein the rubber systems are selected from the group consisting of ethylene-propylene rubber, butyl rubber, nitrile rubber, and mixtures thereof.

13. The method of claim 1, wherein the organic solvent is N-methyl-2-pyrrolidone (NMP), 2,2-dimethoxypropane (DMP), alkylphenolethoxylate (APEO), triethylamine (TEA), or mixtures thereof.

14. The method of claim 1, wherein the binder dispersion-treated fabric material is dried at a temperature of about 105° F. for about 50 minutes.

15. The method of claim 1, wherein the dried binder dispersion-treated fabric material is cured at about 200° F. for about 30 minutes.

16. The method of claim 1, wherein the first and the second films are compatible with the binder, and have a melting point of about ±5° C. to about ±10° C. compared to the melting point of the binder.

17. The method of claim 16, wherein the first and the second films are selected from the group consisting of thermoplastic urethanes and ethylene-vinyl acetate copolymers.

18. The method of claim 17, wherein the thickness of the films is about 0.0005 inches to about 0.025 inches.

19. The method of claim 1, further comprising heating the laminated fabric material for about 1 min to about 20 min at a temperature of about 120° C. to about 200° C.

20. The method of claim 1, wherein the binder dispersion is applied at certain position of the fabric material.

* * * * *